United States Patent
Taveau et al.

(10) Patent No.: US 10,496,979 B2
(45) Date of Patent: Dec. 3, 2019

(54) SMART WALLET

(71) Applicant: PAYPAL, INC., San Jose, CA (US)

(72) Inventors: Sebastien Taveau, Redwood City, CA (US); Curtis Ares Sakamoto, Cedar Park, TX (US); Westley Martin Stringfellow, Los Gatos, CA (US); Joel Yarbrough, Oakland, CA (US)

(73) Assignee: PayPal, Inc., San Jose, CA (US)

( * ) Notice: Subject to any disclaimer, the term of this patent is extended or adjusted under 35 U.S.C. 154(b) by 585 days.

(21) Appl. No.: 14/826,001

(22) Filed: Aug. 13, 2015

(65) Prior Publication Data

US 2015/0348006 A1 Dec. 3, 2015

Related U.S. Application Data

(63) Continuation of application No. 13/330,264, filed on Dec. 19, 2011, now abandoned, which is a (Continued)

(51) Int. Cl.

| | |
|---|---|
| *G06Q 40/00* | (2012.01) |
| *G06Q 20/32* | (2012.01) |
| *H04W 4/02* | (2018.01) |
| *H04M 1/725* | (2006.01) |
| *H04W 4/80* | (2018.01) |
| *G06Q 20/10* | (2012.01) |

(Continued)

(52) U.S. Cl.
CPC ......... *G06Q 20/3224* (2013.01); *G06Q 20/10* (2013.01); *G06Q 20/32* (2013.01); *G06Q 20/3278* (2013.01); *G06Q 20/3572* (2013.01); *G06Q 20/36* (2013.01); *G06Q 30/0222* (2013.01); *G06Q 30/0631* (2013.01); *H04M 1/72572* (2013.01); *H04W 4/023* (2013.01); *H04W 4/80* (2018.02)

(58) Field of Classification Search
CPC ......... G06Q 40/00; G06Q 20/32; G06Q 40/12
See application file for complete search history.

(56) References Cited

U.S. PATENT DOCUMENTS

| 6,018,724 A | 1/2000 | Arent |
|---|---|---|
| 2004/0024703 A1 | 2/2004 | Roskind |

(Continued)

FOREIGN PATENT DOCUMENTS

| CN | 1453731 | 11/2003 |
|---|---|---|
| WO | WO 2008/103883 | 8/2008 |

OTHER PUBLICATIONS

Stephen Ezell, Explaining International IT Application Leadership: Contactless Mobile Payments, Nov. 2009, The Information Technology & Innovation Foundation, web, 2-46 (Year: 2009).*

*Primary Examiner* — I Jung Liu
(74) *Attorney, Agent, or Firm* — Haynes and Boone LLP

(57) ABSTRACT

A service provider provides one or more "best" total value suggestions for one or more items specified by a user. The suggestions are based on one or more of user preferences, user location, available funding options, available local merchant incentives, available manufacturer incentives, and local merchants offering the item. In one embodiment, the "best" total value is the lowest price available to the user. The user may make a purchase using a suggestion or a revised suggestion.

20 Claims, 9 Drawing Sheets

Related U.S. Application Data continuation-in-part of application No. 13/165,180, filed on Jun. 21, 2011, now abandoned.

(60) Provisional application No. 61/359,667, filed on Jun. 29, 2010.

(51) Int. Cl.
| | |
|---|---|
| *G06Q 20/34* | (2012.01) |
| *G06Q 20/36* | (2012.01) |
| *G06Q 30/02* | (2012.01) |
| *G06Q 30/06* | (2012.01) |

(56) References Cited

U.S. PATENT DOCUMENTS

| | | |
|---|---|---|
| 2007/0016535 A1 | 1/2007 | Tedesco et al. |
| 2007/0073585 A1* | 3/2007 | Apple .................... G06Q 30/02 705/14.46 |
| 2007/0075131 A1 | 4/2007 | Alberth, Jr. et al. |
| 2007/0130085 A1 | 6/2007 | Zhu |
| 2007/0244811 A1 | 10/2007 | Tumminaro |
| 2009/0006254 A1 | 1/2009 | Mumm et al. |
| 2009/0018924 A1 | 1/2009 | Roberts |
| 2009/0090783 A1 | 4/2009 | Killian et al. |
| 2009/0119190 A1 | 5/2009 | Realini |
| 2009/0164371 A1 | 6/2009 | Arroyo et al. |
| 2009/0210347 A1 | 8/2009 | Sarcanin |
| 2009/0288012 A1 | 11/2009 | Hertel et al. |
| 2009/0307139 A1 | 12/2009 | Mardikar et al. |
| 2010/0078472 A1 | 4/2010 | Lin et al. |
| 2010/0125495 A1 | 5/2010 | Smith et al. |
| 2010/0145861 A1* | 6/2010 | Law .................... G06Q 20/102 705/76 |
| 2010/0320266 A1 | 12/2010 | White |

\* cited by examiner

US 10,496,979 B2

SMART WALLET

CROSS REFERENCE TO RELATED APPLICATIONS

This application is a continuation of U.S. patent application Ser. No. 13/330,264, filed Dec. 19, 2011, which is a continuation-in-part of U.S. patent application Ser. No. 13/165,180, filed Jun. 21, 2011, which claims priority to U.S. Provisional Patent Application No. 61/359,667, filed Jun. 29, 2010, all contents of which are herein incorporated by reference in their entirety.

BACKGROUND

Field of the Invention

The present invention generally relates to making payments using mobile devices, and more particularly, to using the mobile device to intelligently make payments.

Related Art

Electronic payments are becoming a preferred method of payment because they offer advantages to the user not present with traditional physical payments. With a physical payment, the user is required to carry the funding instrument and present the funding instrument when ready to make a payment. Examples of physical funding instruments include cash, checks, credit cards, debit cards, coupons, gift certificates, gift cards, and the like. These can take up space in a user pocket, purse, or wallet. To reduce space, the consumer may not carry all funding instruments all the time, resulting in the possibility that a desired funding instrument is not available when the consumer is ready to use it at a point of sale (POS). Such physical funding instruments may also be lost or stolen. Thus, physical "wallets" can be cumbersome, inconvenient, and prone to loss.

To remedy this, mobile devices have been and are being used to make payments through payment providers, such as PayPal, Inc. of San Jose, Calif. Such payment providers typically allow a consumer to make a payment through the user's mobile device, such as through the use of barcodes, communication between the payment provider and the merchant, and other methods. After authentication and/or authorization, the payment is made through a user account with the payment provider, where the account is funded through a funding source, such as the user's bank or credit card. The funding source is typically a single default source selected by the user.

While this may allow the consumer to forego carrying credit cards, bank cards, and cash, the user must still decide whether to use the payment provider service, another payment service on the mobile device, or a physical funding instrument. This can be disadvantageous, which also applies to physical wallets, because the user must decide which of the many possible funding instruments to use for a particular purchase. This may result in the user choosing a payment instrument that is not the "best" choice for the transaction.

Furthermore, the consumer may not be aware of certain incentives available for the particular purchase, which may result in the consumer paying a higher price for a purchase.

Therefore, a need exists for a payment solution that overcomes the disadvantages described above with conventional payment methods.

SUMMARY

According to one embodiment, a consumer has an account with a payment provider, such as PayPal, Inc. The account includes at least one funding source, and preferably several. When the user is ready to make a purchase or payment, such as at a point of sale, the payment provider selects what funding source (e.g., Visa, AMEX, credit cards associated with different rewards programs, PayPal, bank account, coupons, gift cards, etc.) to use based on the transaction information, including the amount, type of purchase, merchant, location, etc. The selection can be based on user selected preferences, payment history of user, goals, preferred or incentivized payment sources of the merchant, or any combination of logic. For example, there may be discounts or other rewards at a certain store if a specific card is used, the user may want to primarily use a card to get sufficient reward points for a goal, the user may want to limit certain cards to a maximum monthly or transaction amount, an AMEX Hilton card may be selected for use at a Hilton hotel, etc.

This greatly reduces the time and effort for the user to decide which card or other funding instrument to use. This also helps the user make use of coupons, etc., as part of the funding.

The payment provider may also provide payment directly from a funding source to the merchant so that the recipient need not have an account with the payment provider. This may also apply when the user does not have a payment provider account.

According to another embodiment, different authentication or security levels are applied to different uses of the user device. For example, payments may require one type of authentication, while non-payments (such as information transfers or displays) may require another type of authentication. Within payments or non-payments, there may be additional different security levels. For example, higher security may be required for higher payment amounts and use or display of more sensitive information, such as social security number, credit card number, and the like.

According to yet another embodiment, a consumer is provided with a "best total value" by the payment provider for a specific item or purchase. The best total value may include the name of the merchant, the specific item, and various funding sources and incentives that can be used to get the best value for the purchase. The payment provider may determine the best total value using information such as the item description, the location of the user, the day of intended or potential purchase, information about the funding instruments available to the user, information about incentives, such as coupons, rebates, points, etc., available to the user, user-defined goals, etc. The user may then make the purchase or change one or more details of the best total value suggestion.

As a result, the consumer is provided with a suggestion of how to get the best value for an intended purchase.

These and other features and advantages of the present invention will be more readily apparent from the detailed description of the embodiments set forth below taken in conjunction with the accompanying drawings.

Figure 1A:
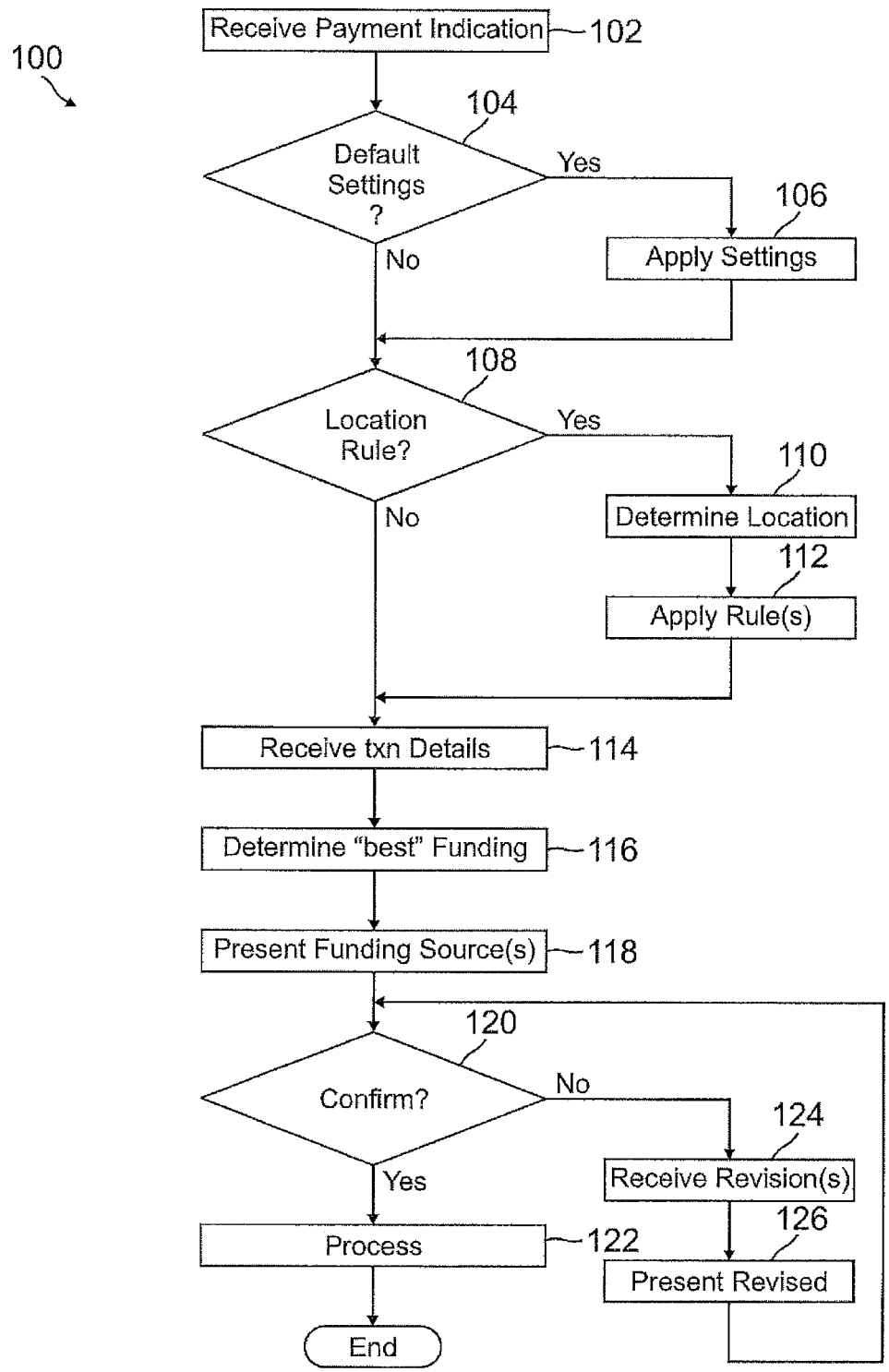
FIG. 1A is a flowchart showing a process a payment provider performs to process a payment from a user's smart wallet, according to one embodiment.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to various embodiments, a smart digital wallet in a user's mobile device provides the user with recommendations or decisions on what funding instruments to use based on transaction information, user preferences, user history, and/or funding instrument information, as well as a best total value suggestion for a purchase. The smart wallet may also be customized with different levels of security for making a payment, based in part on user preferences, transaction amount, location, and other factors. Thus, the user's mobile device can be used as a smart wallet to replace physical funding instruments, while providing numerous advantages not available with a physical wallet.

FIG. 1A is a flowchart showing a process 100 a payment provider performs to process a payment from a user's smart wallet, according to one embodiment. At step 102, the payment provider receives an indication that the user is ready to make a payment for items. Items, as used herein, may include physical goods, digital goods, services, donations, and anything that the user is making a payment for, to, or regarding. In this embodiment, the user is at a physical location or point of sale (POS) for the payment, such as at a store. In other embodiments, the user may be shopping online and making the payment through a computing device, such as a PC.

The indication may be received in any number of ways. One example is the user accessing a payment app on a user mobile device at the POS, which makes a call to the payment provider through the mobile device. The user may enter credentials to access the user's account and enable payment through the mobile device. Another example is the merchant communicating a purchase transaction to the payment provider at the POS through a merchant device. These can be when the user begins a checkout process, during a checkout process, or after all items have been scanned and totaled. In one embodiment, the minimum information communicated at step 102 is a desire for the user to make a payment and user identity/account information. The latter allows the payment provider to access the user's account and data associated with the account.

Once the user's account is accessed, the payment provider determines, at step 104, if there are any default settings to the user's account for payments. Default settings may be determined by the user, such as user defined preferences, by the payment provider, such as based on payment history, or a combination of the two. Default settings include information about the use of funding instruments associated with the user account. For example, the user may have an American Express Hilton Reward credit card, a Citibank debit card or bank account, a Visa Southwest Airlines Reward credit card, and a Visa gift card as some of the funding sources for the user account. The AMEX card may be the main funding source, followed by the Visa gift card, and others in a particular order. So, with a purchase, the AMEX card would be the preferred funding instrument. However, there may be situations where the AMEX card cannot be used, such as at merchants/sites/locations where AMEX is not accepted, the AMEX card is rejected (such as expired, limit reached, fraud suspected, etc.). If the AMEX is unavailable for use, the Visa gift card would be the next choice. However, the Visa gift card may be unavailable because its value has been depleted. The next funding instrument would then be tried.

The default settings may be changed as needed. For example, the AMEX card may be the first choice because the user wants to accumulate Hilton points for an upcoming vacation stay. However, once enough points are accumulated or no longer needed, the user may replace the AMEX card with the Visa card so that the user can accumulate points quicker for free flights. Such changes may be made by the user through the user's account page with the payment provider.

If there are default settings, those settings are applied at step 106. The system also determines, at step 108, whether there are any location-based restrictions or rules for any of the user's funding instruments. For example, a certain gift card or coupon may only be used within the United States. Another coupon may only be used in California. The Visa gift card may be used anywhere, but may have a bonus if used in Arkansas. The bonus may be a 10% credit on the gift card. The Arkansas use may be Visa wanting more spending in Arkansas to help the Arkansas economy in wake of a recent natural disaster.

If there is at least one location-based rule, a location of the user (or POS) is determined at step 110. This may be through a location service or function associated with the user's mobile device. Thus, when the user is ready to make a payment, the user's location will be known through the user's mobile device. Typically, the location is at the POS. The user location may also be determined in other ways. One example is the merchant communicating the identity of the user to the payment provider, which informs the payment provider that the user is with the merchant, where the merchant location is known by the payment provider. The payment provider applies the one or more location-based rules at step 112. The location based rules may be determined by the device capabilities, the user privacy settings, payment provider partnerships, and/or merchant infrastructure capacity (including NFC, GPS, network, IP address, BlueTooth, WiFi). This may include changing the priority of the user defined preferences accordingly.

The system receives, at step 114, transaction details, which can be through the merchant or the user. Transaction details may include information about the items scanned or to be purchased, such as description, type, quantity, and price, merchant information, such as name, account number, main address, local store address, phone number, the transaction date, and the like, and amount of the transaction, including taxes and any discounts/coupons/rewards applied or to be applied.

Using this and any other applicable information, the "best" one or more funding instruments are determined, at step 116, for the user to use in the present transaction. The determination may include processing all or a portion of the information available and received about the user, the merchant, the location, and the transaction. For example, a particular merchant may only accept certain funding instruments (such as Visa and MasterCard only for credit cards), not accept certain funding instruments (such as no American Express or coupons), and/or provide a reward or other incentive for using a particular funding instrument (such as a store branded credit card).

In another example, a particular coupon or gift card may be applicable to one or more purchases in the transaction. Such coupons or gift cards may then be selected for use. Certain coupons, gift cards, and the like may have upcoming expiration dates. Based on the date of the transaction and the expiration dates of applicable funding instruments, appropriate funding instruments may be selected to be used for this transaction. For example, funding instruments about to expire may be prioritized over later-expiring funding instruments.

Once funding instruments are selected for the current transaction, the user may be presented with the selection(s), at step 118, on the user's mobile device. The user may see where each funding instrument is to be applied and how, along with amount applied if appropriate. For example, a certain purchase or item may only allow a certain dollar amount to from a gift card, voucher, or coupon to be applied to the purchase. Thus, one payment to a merchant or seller may include using a plurality of funding sources.

Next, the payment provider makes a determination, at step 120, whether the user has confirmed the selected funding instruments. This determination may include receiving an electronic signal from the user device of a confirmation resulting from the user tapping or otherwise selecting a "confirm" or similar link/button on the device. If a confirmation is received, the transaction may be processed, at step 122, with the selected funding instruments. Processing may be through the payment provider, where the payment provider receives payment details through the user device or the merchant, determines whether one or more payments can be approved, debiting user account(s) and crediting merchant account(s) immediately or at a later time, with the payment provider acting as an aggregator or escrow agent in compliance with a mechanism described in commonly owned U.S. patent application Ser. No. 12/643,972, entitled "Trusted Integrity Manager (TIM)", filed Dec. 21, 2009 and incorporated by reference in its entirety, and sending a notification to the user and/or the merchant that the payment for the transaction has been approved or denied. If multiple funding sources are used, the merchant may only be sent a single notification with the payment being processed, without separate or individual statements or notifications of each different funding source. Processing may also be directly through the user. For example, the user may simply present a physical credit card, where processing is through conventional credit card processing with the merchant.

If the user does not confirm the selected funding sources, the user may decide to revise the selection, such as adding one or more different funding sources, deleting one or more funding sources, or applying a funding source differently (e.g., using a lesser amount of a gift card). For example, even though the payment provider selected the AMEX card based on the user's previously set preference (the user had wanted to accumulate hotel points), the user may no longer need the points. This may be due to the user obtaining a sufficient amount of points, the hotel stay changed, or other reasons. The user also may not have changed user preferences yet. As a result, the user may replace the AMEX card with the Visa card. This change could be done at transaction time or within a reasonable time frame (e.g., a couple of days) as agreed upon the user agreement, the payment provider rules and the merchant acceptance and in compliance with local regulations.

In one embodiment, the user can revise selected funding instruments through the user device. For example, the user may select a funding for revision. The selected funding source may be deleted or otherwise revised accordingly, such as through user actions through the user device. A new funding source may be added, such as by selecting from a list of available funding sources. The list can be in any form and accessed through any number of ways, including a drop down menu or a new window on a browser or app.

After one or more revisions to the selected funding sources are made by the user, the revisions are communicated to and received by the payment provider at step 124. Once received, the payment provider may transmit the user-revised payment instrument selections to the user at step 126. The user may view the revised payment selections, such as on the user device, and confirm or revise again as needed using the steps described above. When the user confirms the payment instruments, the payment can be processed at step 122.

Note that the various steps and decisions above may be performed in different sequences and select ones may be omitted, as well as additional steps and decisions added.

Figure 5A:
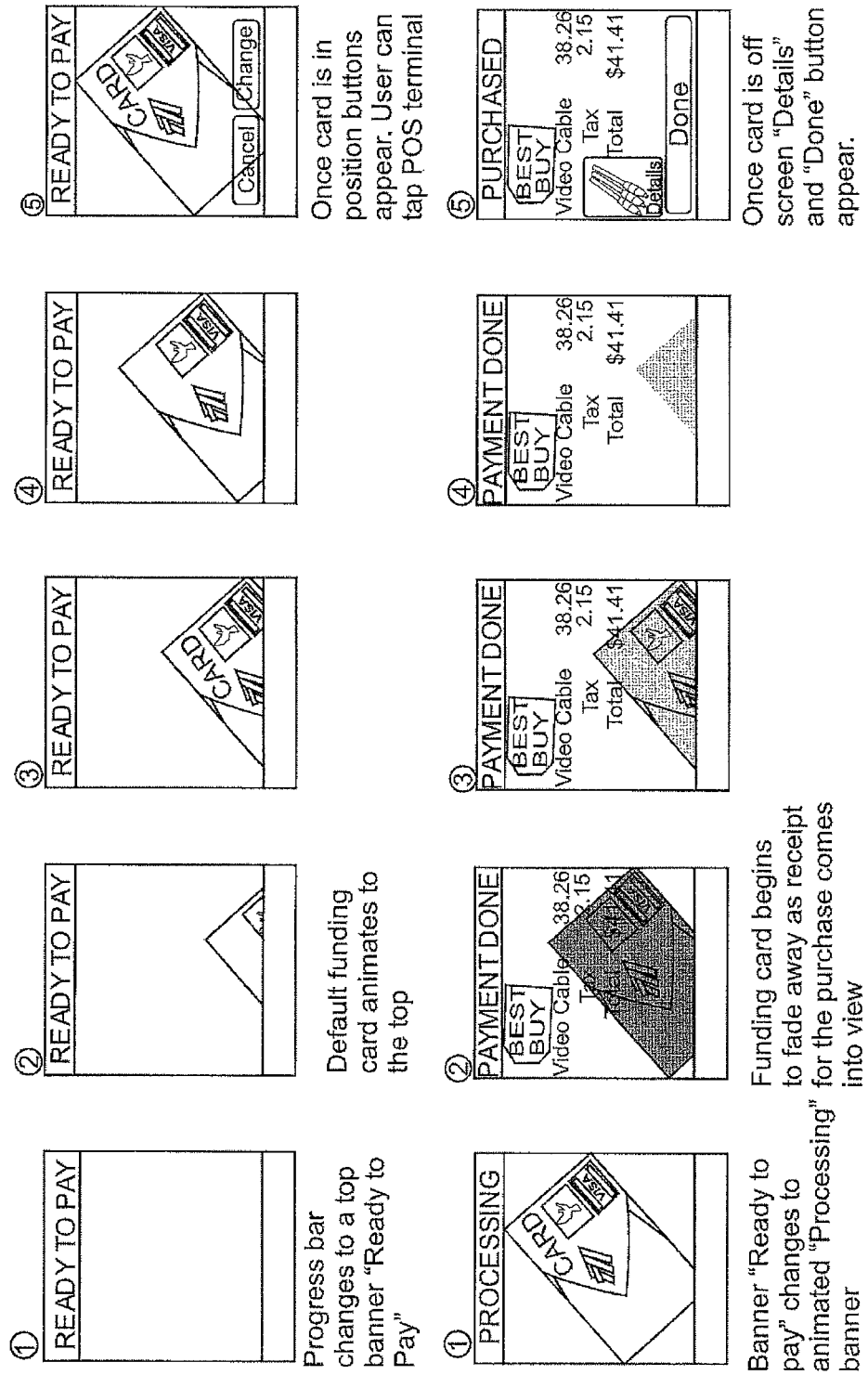
FIGS. 5A-5D are exemplary flows with sample screen shots showing various flows using a smart wallet according to one embodiment.

Thus, the user is able to use the "best" funding instruments to pay for a transaction using selections from the payment provider based on user set preferences, location, transaction details, merchant, date, and other factors. Payment can be made through the user's mobile device, thereby eliminated the need for the user to carry physical funding instruments like cash, credit cards, debit cards, checks, coupons, and gift cards. FIG. 5A shows an exemplary flow that a user may see on the user's mobile device during a payment flow, including the ability to change or cancel the selected (default) funding source.

Figure 1B:
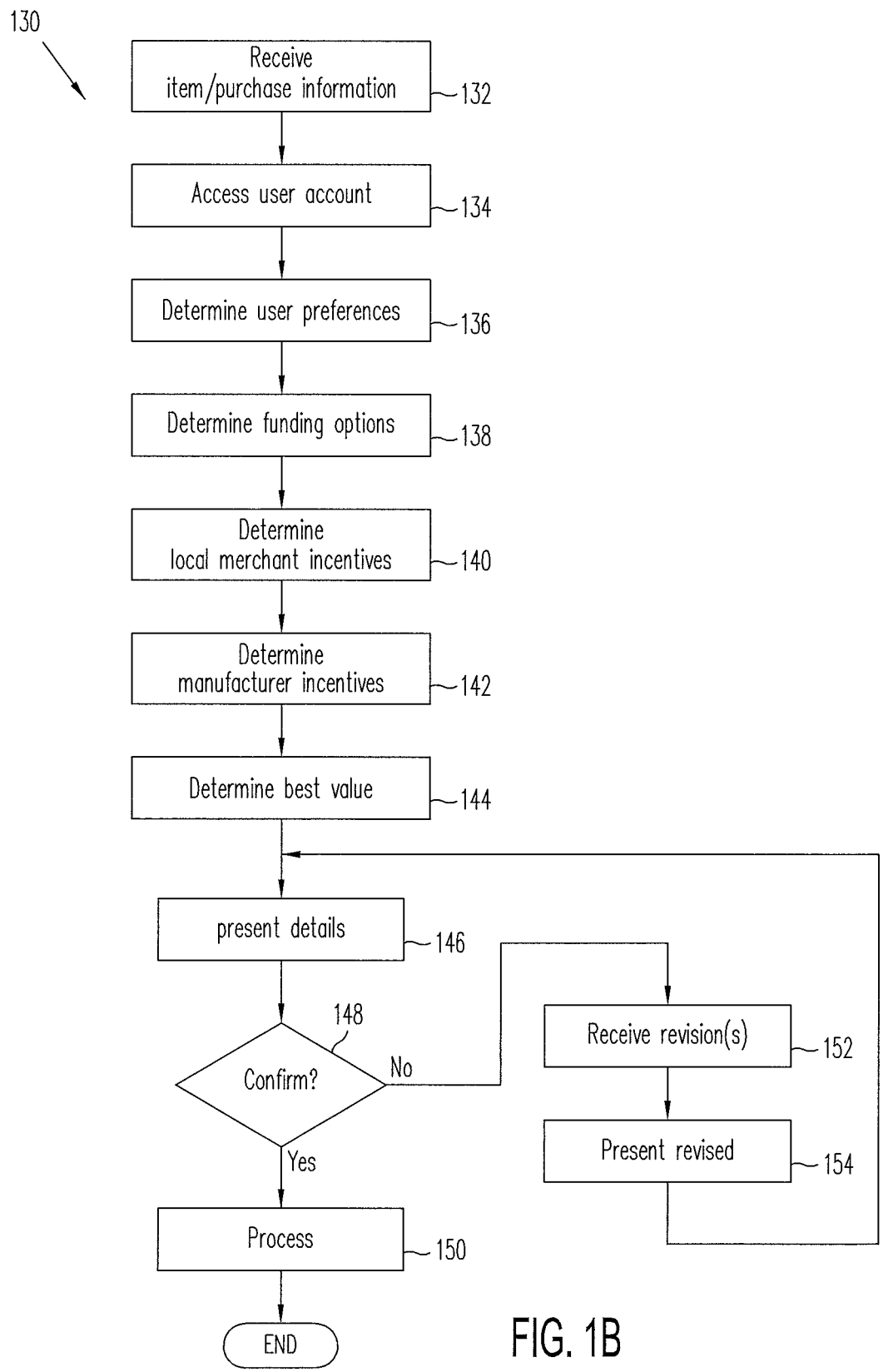
FIG. 1B is a flowchart showing a process a payment provider performs to provide a user with a best total value suggestion according to one embodiment.

FIG. 1B is a showing a process 130 a payment provider performs to provide a user with a best total value suggestion according to one embodiment. At step 132, the payment provider receives information about an item of interest to the user or a purchase intended by the user. Items, as used herein, may include physical goods, digital goods, services, donations, and anything that the user is making a payment for, to, or regarding. In this embodiment, the user is at a physical location or point of sale (POS) for the payment, such as a brick-and-mortar store. In other embodiments, the user may be shopping online and making the payment through a computing device, such as a PC.

The information may include an item description (e.g., Apple® iPhone® 4S), an item identifier (e.g., a product code), a photo, or other means of description. For a purchase, the information may include a plurality of items or a single item for intended or potential purchase. The information may be received in any number of ways. One example is the user accessing a payment app on a user mobile device, which makes a call to the payment provider through the mobile device. The user may enter credentials to access the user's account and enable payment through the mobile device. Another example is accessing the user's account through a PC. The user may provide item/purchase information through entry of information into fields, either by text or voice, selection of items through a drop-down menu, or other means through the user's account. The user may also provide the information through a call, email, fax, or other means to the payment provider.

If the provided information is insufficient to identify the user (e.g., missing or inaccurate password, PIN, user identifier, etc.), to identify the one or more items with sufficient detail to enable meaningful results (e.g., "television," "table," or "DVD"), or other information needed to provide the service for the user, the user may be asked to supplement or revise the provided information.

Using information from the user and/or the user device, the payment provider accesses the user's account with the payment provider. This may include trying to match a user identifier with a corresponding account in a user account database. If an account is identified, but is inactive, the user may be asked to activate the account, such as by providing information like an updated credit card, email address, funding source, etc. If no account is found, the user may be asked to create or open an account or to re-enter a user identifier and password/PIN. Creating an account may be through conventional means, such as providing a name, address, phone number, user name, password/PIN, email address, date of birth, etc.

Once the user's account is accessed, the payment provider determines, at step 136, any user preferences for the user's account. Preferences may include use of funding instruments, as described above, which may include gift cards and other funding instruments. For example, the user may specify that one or more gift cards be used first before a credit card or debit card, since specific gift cards may have expiration dates and should be used first whenever possible.

Next, at step 138, the payment provider determines available funding options. This determination may be based on the location of the user, the merchant, the date, the item or items intended for purchase, the amount, and other such information. For example, the user may have one or more of gift cards, vouchers, credits, coupons, or the like that are merchant-specific. The user may also have such funding options that are general, such as a VISA® gift card. The determination may include determining which ones of the funding options are available for this intended purchase. For example, restrictions on specific funding options may preclude use, such as the funding option has expired, the funding option is required to be used on a certain day or days, the funding option is not available in the area of the user, etc.

At step 140, the payment provider determines any local merchant incentives for the item(s). As part of the determination, a location of the user is determined. This may be through a location service or function associated with the user's mobile device or through the user entering a specific location. The location may be obtained at step 132 or at any other time. The location determination may be skipped if not needed, such as if the user is ordering the item online and having the order shipped, as opposed to a local purchase and/or pickup. As such, those of ordinary skill in the art will appreciate that the steps described herein can be modified and/or skipped if local shopping services are not needed.

The payment provider determines which merchants in the area offer the item(s). The payment provider may also determine which merchants offer similar items in another embodiment. "Local" merchants may be ones within a user-specified distance from the user location, such as within 1 mile or 5 miles "Local" may also be defined by the payment provider, determined in part by the type of location of the user. For example, if the user is in a densely populated shopping area, the local distance may be shorter than if the user is in a sparsely populated rural area. For the former, the user may be walking with lots of options, and thus only interested in merchants within a shorter distance. For the latter, the user may be driving and need a wider area for meaningful results.

Once the merchants are identified, merchant-offered prices for the item(s) are determined for each merchant. Of those merchants, the payment provider also determines if any of these merchants offer incentives. The incentives may be specific to the item(s), for general purchase, for purchases of a certain amount or type, and/or available for a specific day or times within a certain time of the user request. For example, the merchant may be offering a coupon, discount, or other incentive (such as get a free gift or store credit) for purchasing the specific item, for making a store purchase within a certain time or day, for purchases above $100 (which is less than the item total), etc. The payment provider may search one or more databases, either through the merchant, the payment provider, or a third party, to find the incentives. The payment provider may also search local sites, magazines, and newspapers. For example, individual merchants may communicate all offers to the payment provider, the payment provider may search the web for incentives or merchant databases, or the payment provider may query local merchants.

The payment provider may also determine, at step 142, any manufacturer incentives, such as coupons, being offered and available for the item(s). For example, Apple® may be offering a rebate for the purchase of an iPhone® 4S that is available for use. The payment provider may search incentives from its database, from a third party database, or manufacturer databases. The payment provider may also query or search manufacturer sites or local websites, newspapers, and/or magazines.

Using this and any other applicable information, the "best" total value for the item(s) or purchase for the user is determined at step 146. The determination may include processing all or a portion of the information available and received about the user, the merchants, the location, the transaction, and all available incentives. In one embodiment, the "best" total value may be a combination of incentives and funding sources that results in the lowest price for the item(s). In another example, the "best" total value is one that uses all incentives about to expire, such as within one week of the purchase. In another example, the "best" total value utilizes a specific credit card because the user wants to accumulate points as quick as possible, but also incentives that are expiring soon and/or apply specifically to the item. If the item appears to be a one-time large purchase, such as a big screen TV, the "best" total value may be a combination of all incentives that are only applicable to the big screen TV purchase, with the assumption that these incentives will not be needed once the TV is purchased. However, if the item appears to be a recurring purchase, such as diapers, the "best" total value may not utilize all available incentives because the user is likely to need those for later purchases of the same item.

Once "best" total value is selected for the item(s), the user may be presented with the selection(s), at step 146, on the user's mobile device or other user device. The user may see where each funding instrument is to be applied and how, along with amount applied if appropriate, as well as any incentives being used. For example, the "best" total value for an Apple® iPhone® 4S may be at the Best Buy® on First Street having a sale on the iPhone® 4S, using a Best Buy® $25 off coupon, an Apple® iPhone® $10 rebate, a user gift card from Best Buy® expiring next week, and the user's American Express® Hilton Honors® credit card, which the user has identified as a preferred funding source to accumulate points and which is also offering a $10 credit on its use at Best Buy® and other specific merchants. The total amount may also be shown. For example, the user may see a Best Buy® price of $299, but after all the incentives are applied, the user sees a total price of $145 and a savings of $154. The payment provider may provide one or more "best" total values for the user to select from. For example, the user may be presented with three suggestions, including the merchant and total price to be paid. The user may obtain additional details by selecting an individual suggestion.

Next, the payment provider makes a determination, at step 148, whether the user has confirmed the presented "best" total value funding mix. This determination may include receiving an electronic signal from the user device of a confirmation resulting from the user tapping or otherwise selecting a "confirm" or similar link/button on the device. If a confirmation is received, the transaction may be processed, at step 122, with the selected funding instruments and incentives applied. Processing may be through the payment provider, where the payment provider receives payment details through the user device or the merchant, determines whether one or more payments can be approved, debiting user account(s) and crediting merchant account(s) immediately or at a later time, processing coupons, rebates, and other incentives, and sending a notification to the user and/or the merchant that the payment for the transaction has been approved or denied. If multiple funding sources and/or incentives are used, the merchant may only be sent a single notification with the payment being processed, without separate or individual statements or notifications of each different funding source. Processing may also be directly through the user. For example, the user may simply provide the identified funding sources and incentives to the merchant or present a display, such as listing or code (e.g., a barcode or QR code) that the merchant can capture to process the payment. Various incentives used may be marked as no longer valid or have their credit or balance reduced as appropriate.

If the user does not confirm the presented funding mix, merchant, or selected funding sources, the user may decide to revise the suggestion, such as adding one or more different funding sources, deleting one or more funding sources, applying a funding source differently (e.g., using a lesser amount of a gift card), selecting a different merchant, deleting one or more incentives, etc. For example, the user may want to increase the total price of one suggestion by not using a 20% coupon because the user has plans on making a higher dollar amount purchase in the near future and wants to use the 20% coupon for more savings for the later purchase. In another example, even though the payment provider selected the AMEX® card based on the user's previously set preference (the user had wanted to accumulate hotel points), the user may no longer need the points. This may be due to the user obtaining a sufficient amount of points, the hotel stay changed, or other reasons. The user also may not have changed user preferences yet. As a result, the user may replace the AMEX® card with the Visa card. This change could be done at transaction time or within a reasonable time frame (e.g., a couple of days) as agreed upon the user agreement, the payment provider rules and the merchant acceptance and in compliance with local regulations.

In one embodiment, the user can revise selected funding instruments, merchants, and/or incentives through the user device. For example, the user may select a funding source, merchant, and/or incentive for revision. The selected funding source, merchant, and/or incentive may be deleted or otherwise revised accordingly, such as through user actions through the user device. A new funding source, merchant, and/or incentive may be added, such as by selecting from a list of available funding sources, merchants, and/or incentives. The list can be in any form and accessed through any number of ways, including a drop down menu or a new window on a browser or app.

After one or more revisions to the selected funding sources, merchants, and/or incentives are made by the user, the revisions are communicated to and received by the payment provider at step 154. Once received, the payment provider may transmit the user-revised payment instrument, merchant, and/or incentive selections to the user at step 146. The user may view the revised payment selections, merchant, and/or incentives, such as on the user device, and confirm or revise again as needed using the steps described above. When the user confirms the payment instruments, merchant, and/or incentives, the payment can be processed at step 150.

Note that the various steps and decisions above may be performed in different sequences, combined, and specific ones may be omitted, as well as additional steps and decisions added.

Thus, the user is able to view "best" options for an intended purchase using both user goals/preferences and location, as well as incentives in the user's wallet and incentives generally available through the merchant and/or the manufacturer. The user may change one or more of the suggested incentives, funding sources, or merchants as desired. Payment can be made through the user's mobile device, thereby eliminated the need for the user to carry physical funding instruments like cash, credit cards, debit cards, checks, coupons, and gift cards, while having a system provide a best value to the user, such as the lowest price or one that maximizes a user's preferences.

Figure 2:
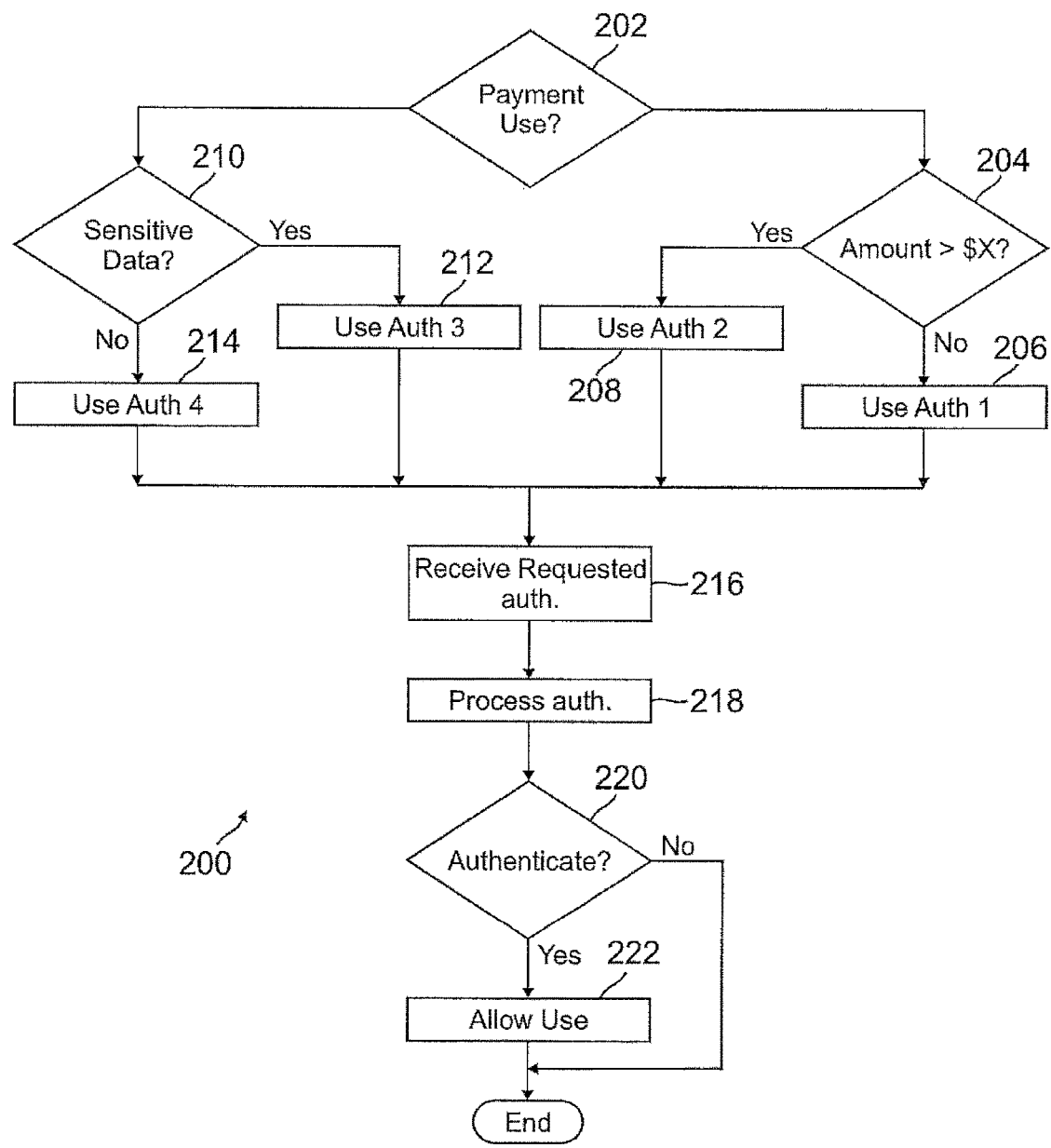
FIG. 2 is a flowchart showing a process for using a user mobile device as a digital wallet with different authentication levels according to one embodiment.

FIG. 2 is a flowchart showing a process 200 for using a user mobile device as a digital wallet with different authentication levels according to one embodiment. A typical physical wallet may contain non-payment cards, such as medical insurance cards, frequent flyer numbers, hotel loyalty numbers, social security card, auto club card, and the like, in addition to funding instruments like those discussed above. A mobile device, such as smart phone or tablet, may be able to store such personal information of the user, such that the mobile device can become more like a physical wallet in that it can then contain both payment instruments and user information.

To use the mobile device for payment, the user typically is required to enter a password or PIN and a user/device identifier, such as a user name, email address, or phone number, unless the user/device identifier is automatically communicated to the payment provider through the mobile device. This can be time-consuming and cumbersome, especially with the small physical and virtual keypads associated with mobile devices. However, such authentication is needed to protect the funding instruments and prevent unauthorized users to make payments from the user's account.

There may be other data or functions in the phone that do not require the authentication levels of payments. For example, a frequent flyer number or transmitting of a frequent flyer number may not require the level of security as sending a payment. Other information, such as the user's social security number, may require additional security. Even payments may allow different levels of security. For example, a payment transaction of less than $20 may not require as much security as a payment transaction of greater than $200. Thus, FIG. 2 illustrates an example of how a mobile device or user of the mobile device may be authenticated for different information or transactions using the mobile device.

At step 202, a determination is made whether the mobile device, for the current use, is to be used for payment. Payment transactions typically will require stronger authentication. The determination may include receiving an indication from the user through the mobile device, such as selecting a payment app, or from a recipient, such as a seller, through a recipient device identifying the user or payer. If the mobile device will be used for a payment transaction, a determination is made, at step 204, whether the amount of the payment transaction will be greater than a certain amount, X. This amount can be set by the user or the payment provider. Higher amounts typically will require stronger authentication. The amount can include use of funds from the user's account with the payment provider, use of coupons, gift cards, vouchers, etc., and/or use of other funding sources such as credit cards.

Figure 5B:
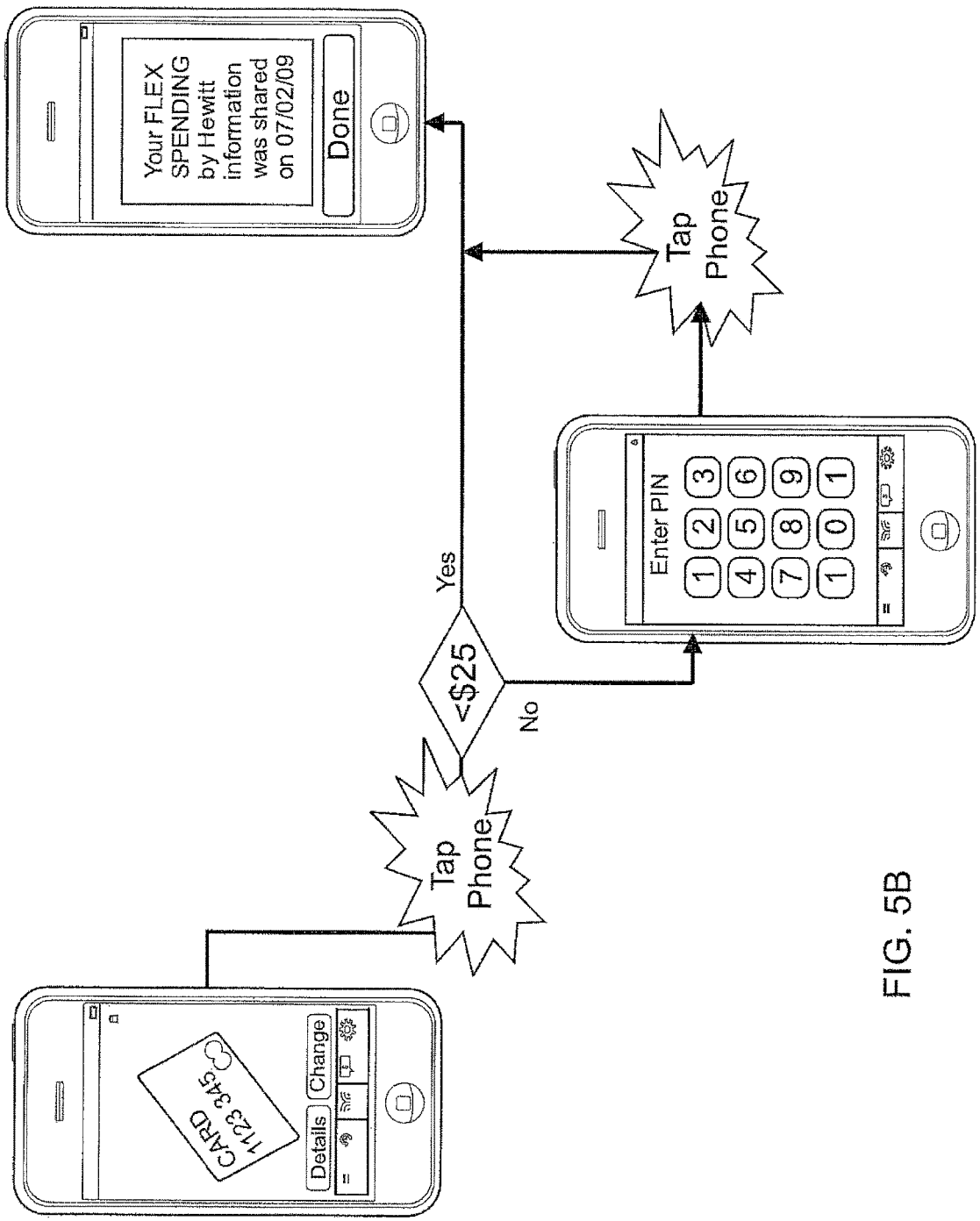

If the anticipated payment amount is less than or equal to X, the payment provider may require the user to authenticate using a first authentication level, Auth1, at step 206. Auth1 may simply require the user to unlock the mobile device or access a payment app. If the anticipated payment amount is greater than X, the user may be required, at step 208, to authenticate through a second authentication level, Auth2, which is stronger than Auth1. An example of Auth2 may include entry of a user PIN, biometric information, a password, or other data, in addition to what was required at step 206. FIG. 5B illustrates a use case where there are different authentication levels based on the amount of the transaction.

If, as determined, at step 202, the current transaction is not for payment, a determination may be made, at step 210, whether the transaction involves "sensitive" or "confidential" information. Examples of sensitive information may include the user's social security number, a bank account number, a password, credit card numbers including security codes, debit card numbers, etc. Examples of non-sensitive information stored in the mobile device may include account numbers for airline loyalty programs, hotel loyalty programs, merchant loyalty programs, and the like, medical insurance policy number, dental insurance policy number, AAA membership number, etc. The user may determine which information is sensitive and which is not, such as by designating specific data or types of data within the scope of compliance with local and national laws regarding privacy and based on the residence of the user (e.g., County, Province, State, Country).

At step 212, the user is required to authenticate at a third authentication level, Auth3, when the transaction involves exposure or transmission of sensitive information. Auth3, in one embodiment, is a stronger authentication than Auth1, but weaker than Auth2. In another embodiment, Auth3 is the same as Auth2. Auth3 may include requiring the user to enter an identifier, such as an email address, phone number, or user name.

If the information is not sensitive, the user may be requested to authenticate using a fourth authentication level, Auth4, at step 214. Auth4 may be the same as Auth1. In another embodiment, Auth4 is weaker than Auth1, Auth2, and Auth3. For example, Auth4 may include the user simply being able to use the mobile device, and thus effectively not requiring any authentication, just possession of the device.

Note that the above authentication levels are just examples and not limiting. For example, additional authentication levels may be employed. This may be due to more than two levels of authentication for a payment, with the different levels based on a plurality of transaction amount thresholds. Information may also be divided into more than two categories of just sensitive and non-sensitive. Furthermore, determinations, in addition to or in place of, whether the transaction is for a payment and whether the transaction involves sensitive information stored in the mobile device may be included.

After the specific authentication level is requested/required, the requested information is received, at step 216, from the user, such as through the user mobile device. The information may be received by the user entering the requested information, such as through a keypad, keyboard, touch pad, touch screen, or other data input. Once received the information is processed by the payment provider, at step 218. Processing may include determining if the received information is what was requested and whether the received information was what was expected. This can be through accessing the user's account and checking authentication information of the user.

A determination is then made, at step 220, whether the user can be authenticated. This determination may include typical authentication procedures for the payment provider, including any fraud analysis, account restrictions, transaction limits, etc.

If the user is authenticated, the transaction moves forward at step 222. The transaction can proceed with a payment process, a communication, display or access of data/information, or other use of the mobile device. However, if the user authentication fails, the transaction may not be allowed to proceed until the user is authenticated. Thus, the payment provider may allow the user one or more additional attempts to authenticate, using the same authentication requests or something different. For example, the user may be asked a security question.

Accordingly, the payment provider (and/or the user) may set different levels of security to be linked on the access to the wallet or some part of the wallet. As an example, the user may not care about protecting coupons or some loyalty components (e.g., frequent flyer card or movie theater reward card), but will care about protecting credit cards or payment instruments. The basic default security settings of the wallet may be speed of transaction over higher security (resulting in more friction or interaction from the user). However, the "smarter" the wallet will be, the better security with little user interaction can be provided by the payment provider.

For an example, a user could decide that for any transaction, the user does not want to be asked anything. As long as the smart wallet is triggered properly, the transaction will go through. Some users, being more cautious, may want to see any transaction and will ask to be prompted for information of transactions going through the smart wallet. Other users, wanting more security, could decide to be prompted for an actual validation of the transaction by entering a PIN, a password or a fingerprint/biometric component. The level of security could be linked also to the amount of the transaction, as mentioned above. For example, under $20, no action required, between $20 and $50, get a prompt to inform the user, above $50, enter a PIN. These levels could be flexible and decided by the user but again, with a validation/association to the risk profile managed by the payment provider.

Figure 5C:
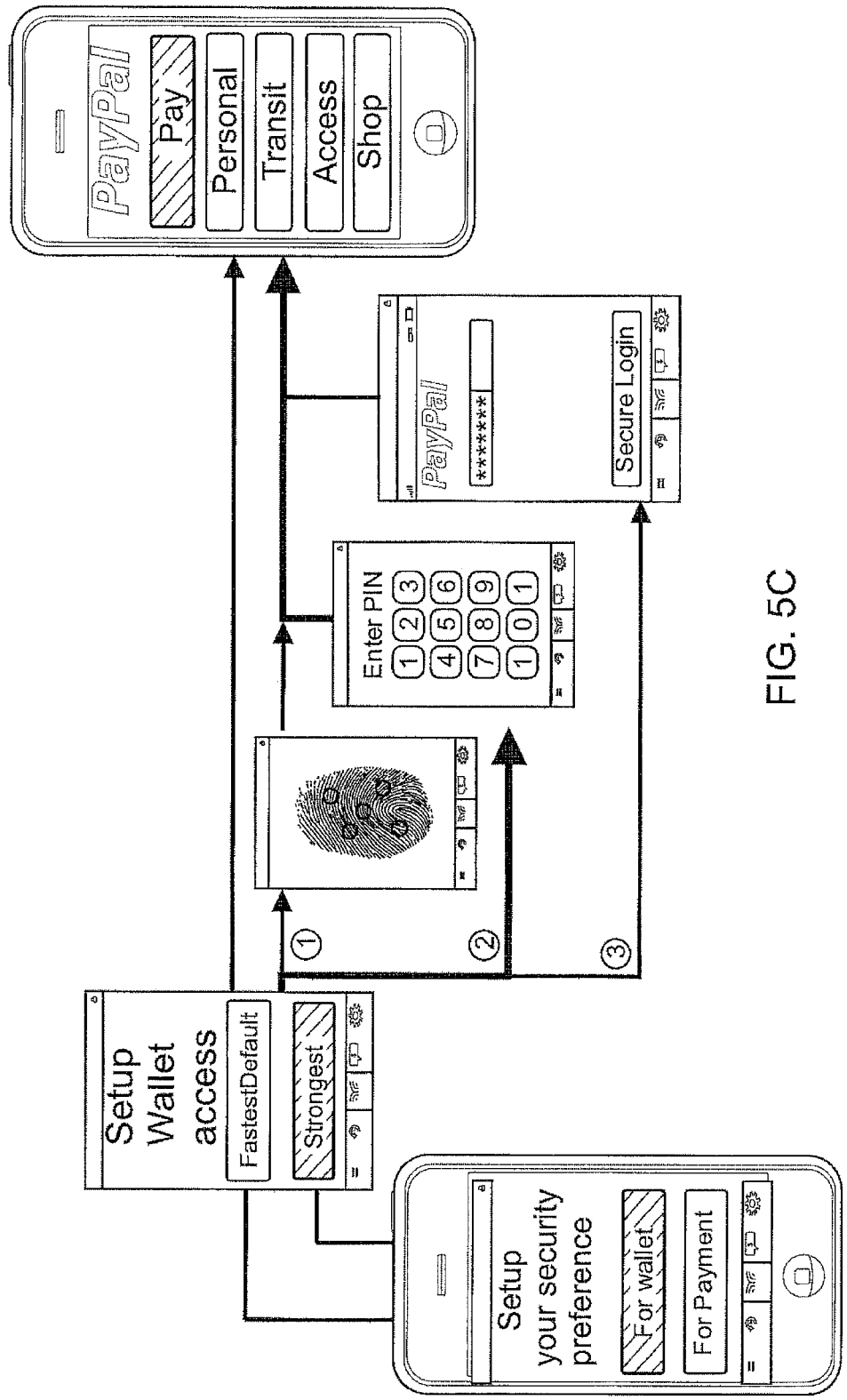

Thus, using the above, a user may have multiple security choices when setting up the user's mobile device and using the mobile device for different transactions or uses. This can provide a more frictionless user experience by not requiring the user to enter passwords/PINs or biometric information for all uses of the phone. Multiple security choices can also protect the user from fraudulent uses of the mobile device by requiring heightened or stronger authentication for higher payments or access to extremely sensitive information. FIG. 5C illustrates an exemplary flow, with different security or authentication levels for different wallet uses.

There may be several components to such a digital wallet described above, including a user profile (or user preferences), a risk profile, and stored value. A user may create a user profile for the smart wallet. Typically, the more information the user provides, the "smarter" the wallet. The payment provider can use this information to make a more informed decision on funding instruments for each transaction. Examples of what the user may enter into the profile include spending preferences, spending limits, goals, preferred funding instruments, etc. The user profile may be revised by the user, such as by revising profile information. The profile may also be revised by the payment provider, such as based on user transactions. For example, if the user continues to revise funding instruments suggested or presented by the payment provider, the payment provider may revise the user profile accordingly to reflect the user preferences.

Another component, the user's risk profile, may be based in part on parameters or information from the payment provider. For example, a long time user of the payment provider service with a verified address and payment instruments (e.g., a bank account linked and verified to the user's payment provider account) will have a better risk profile than a user who just registered and has not linked/verified any bank account to his account. Other elements that may be used to build a user risk profile include the make/model of the user's mobile device (e.g., if it is registered with the payment provider (phone number but also hardware/software configurations, browser, etc.)). While the main risk profile may be stored in the cloud, a subset version could be stored on the mobile device with a specific set of parameters, especially for "offline" transactions using a stored value.

Stored value is an amount of cash the user maintains as a balance with the payment provider for payments. The payment provider may create an "extrapolation" of this balance on the mobile device of the user. This stored value may be linked to the risk profile of the user. For example, if a user with an excellent risk profile has a $500 balance on his payment provider account, then the payment provider may grant the user access to a stored value of $400 or even $500. A new user to the payment provider with an unverified account may have a $500 account balance with the payment provider, but would be allowed to have a stored value emergency access of only $5 or $50 or whatever amount would be deemed to be an acceptable risk for the payment provider for that user.

In one embodiment, the payment provider maintains a dynamic stored value management system that will rely on the capacity to enforce a verification of stored value spending against the balance remaining in the cloud. With data based on the mobile device, the payment provider could feed back in real time the stored value spending history against the account balance on a constant basis. However, for some mobile devices with limited functions or for a mobile device going on low battery mode, the payment provider may not be able to feed back this history and will have to grant a level of access in an offline/off the cloud mode. In one example, a user is trying to catch the last subway and the user's mobile device is NFC-enabled, but the battery is almost depleted. However, a contactless reader from the subway company is set to power up the NFC chip on the user device and provide enough energy boost in a short period of time to retrieve a ticket and/or payment to grant access through the gate. At that point, the payment provider may not have the option to provide feedback for any verification to the cloud, but the "smart wallet" will be able to provide the needed funds offline (and register it in the transaction history log or journal for future synchronization). By doing so, the payment provider is taking the risk but also making sure the user experience is on par with the user expectations or online payment transactions.

The payment provider may manage offline transactions from an offline transaction history log applied against the stored value balance. However, based on the risk profile, the payment provider may associate parameters to this function of the smart wallet, such as number of transaction, transaction amount, time offline, etc. and force back a connection to the cloud to update the smart wallet and the stored value balance.

In order to manage the user and risk profiles, as well as matching data to trigger some functions of the smart wallet (e.g., user location, user preference from that specific handset, transaction log history, etc.), a back-end module may be in charge of the "smart" or intelligence in the smart wallet. This could be managed by components that are part of the payment provider system. By doing so and creating this "intermediate" buffer, the payment provider can deliver a faster service towards the mobile device and manage the stored value better against the risk profile but also provide a needed protection/isolation of the main user account residing in the payment provider core system.

From a technical point of view, the wallet may be an application residing on the mobile device and linked to the payment provider wallet in the cloud. Some components of the wallet (e.g., user interfacing) could be normal applications such as Java applet, widget or native type. However security functions (anti-phishing, anti-spoofing mechanisms, etc.) may need to be disassociated from the basic function and be launched from a "trusted" element/component on the mobile device. This could be a hardware and/or a software component. Examples of such components include TrustZone from ARM, Embedded Secure Element, Micro SD Card or SIM card. In one embodiment, the smart wallet or account remains in the cloud at all times and the mechanism to protect it are never exposed to the user or mobile device. For this reason, the user and risk profiles are managed differently.

The following provides one example of a smart wallet use case. A Costco customer has an American Express Costco branded card. He also goes on a regular basis to a Costco store located near his home. By monitoring the payment history of this user in that store/merchant, the payment provider will know that the user pays 90% of the time with this Amex card. The 10% remaining are payments made with a debit card. Both instruments are registered with the user's payment provider account.

By using the smart wallet (and assuming the store or merchant is known by the payment provider or the payment provider has created a business addresses register), the user may then have his default payment instrument proposed to him as follows: 1) Payment instrument #1 (preferred): American Express Costco card; 2) Payment Instrument #2 (secondary): Debit card; 3) Payment Instrument #3 (Stored value): Payment Provider Balance extension in physical world. The user may edit or revise as desired.

Figure 5D:
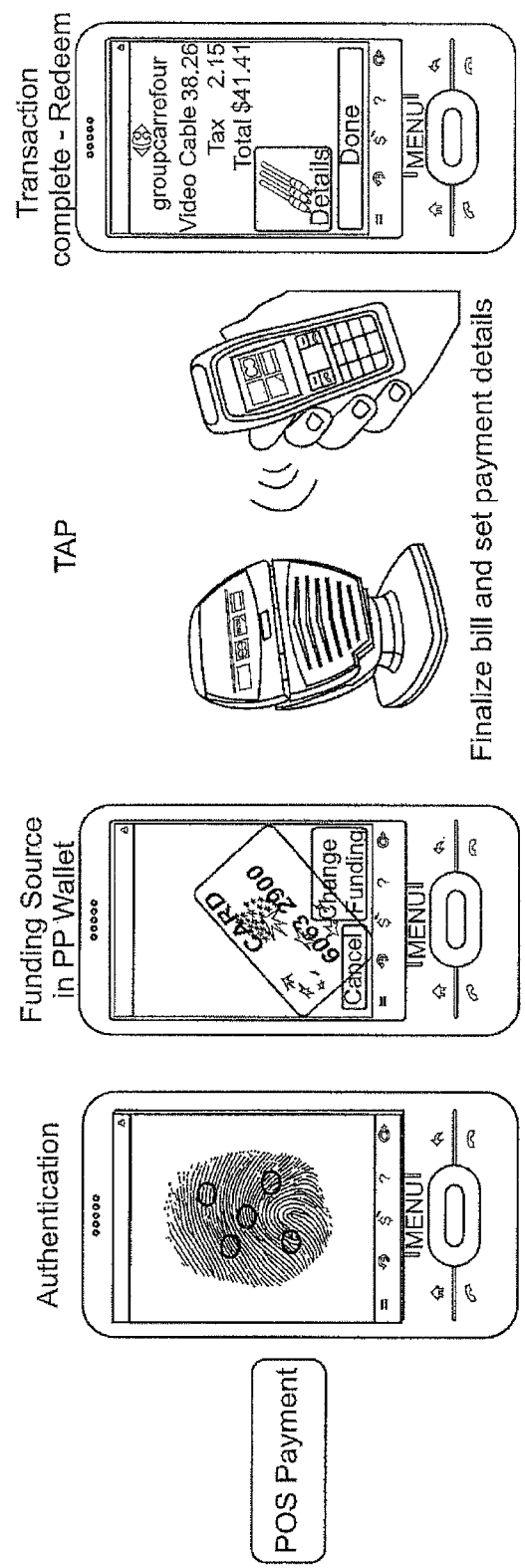

This selection will be triggered by the user profile, his specific location (leverage from the GPS position) and (if enabled) a store "wireless" signal sent to the mobile device of the user and "read" by the smart wallet (e.g., through an NFC tag, Bluetooth (existing pairing), WiFi, or other). FIG. 5D illustrates a typical use case for a smart wallet, where the communication is an NFC communication through a POS device. By doing triangulation of data, the smart wallet may be able to enhance the choice of payment instruments.

When the user arrives at the cash register, he connects to the payment provider, such as through an NFC channel, a remote/online session, etc. Transaction information, such as amount, store, merchant, type of purchase, etc., is communicated to the payment provider, as well as the location of the user and/or POS and any other information needed by the payment provider. The payment provider accesses the user's account and preferences and decides which funding instrument or combination of funding instruments to use automatically.

Figure 3:
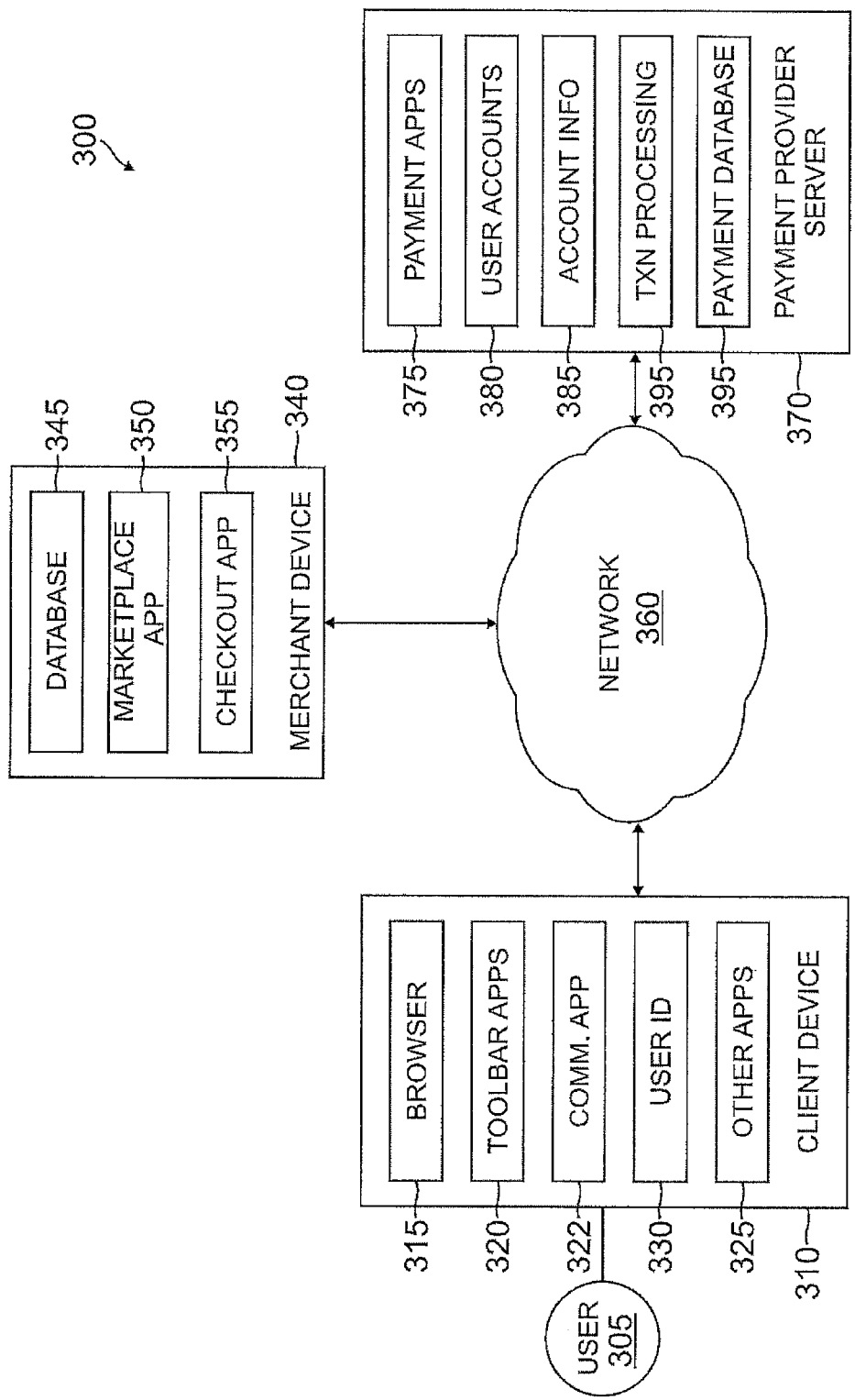
FIG. 3 is block diagram of a networked system suitable for implementing the process described herein according to an embodiment.

FIG. 3 is a block diagram of a networked system 300 configured to handle a transaction using a smart wallet, such as described above, in accordance with an embodiment of the invention. System 300 includes a user device 310, a merchant server 340, and a payment provider server 370 in communication over a network 360. Payment provider server 370 may be maintained by a payment provider, such as PayPal, Inc. of San Jose, Calif. A user 305, such as a sender or consumer, utilizes user device 310 to perform a transaction using payment provider server 370. Note that transaction, as used herein, refers to any suitable action performed using the user device, including payments, transfer of information, display of information, etc.

User device 310, merchant server 340, and payment provider server 370 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360.

Network 360 may be implemented as a single network or a combination of multiple networks. For example, in various embodiments, network 360 may include the Internet or one or more intranets, landline networks, wireless networks, and/or other appropriate types of networks.

User device 310 may be implemented using any appropriate hardware and software configured for wired and/or wireless communication over network 360. For example, in one embodiment, the user device may be implemented as a personal computer (PC), a smart phone, personal digital assistant (PDA), laptop computer, and/or other types of computing devices capable of transmitting and/or receiving data, such as an iPad™ from Apple™.

User device 310 may include one or more browser applications 315 which may be used, for example, to provide a convenient interface to permit user 305 to browse information available over network 360. For example, in one embodiment, browser application 315 may be implemented as a web browser configured to view information available over the Internet, including accessing a loyalty site. User device 310 may also include one or more toolbar applications 320 which may be used, for example, to provide client-side processing for performing desired tasks in response to operations selected by user 305. In one embodiment, toolbar application 320 may display a user interface in connection with browser application 315 as further described herein.

User device 310 may further include other applications 325 as may be desired in particular embodiments to provide desired features to user device 310. For example, other applications 325 may include security applications for implementing client-side security features, programmatic client applications for interfacing with appropriate application programming interfaces (APIs) over network 360, or other types of applications. Applications 325 may also include email, texting, voice and IM applications that allow user 305 to send and receive emails, calls, and texts through network 360, as well as applications that enable the user to communicate, transfer information, make payments, and otherwise utilize a smart wallet through the payment provider as discussed above. User device 310 includes one or more user identifiers 330 which may be implemented, for example, as operating system registry entries, cookies associated with browser application 315, identifiers associated with hardware of user device 310, or other appropriate identifiers, such as used for payment/user/device authentication. In one embodiment, user identifier 330 may be used by a payment service provider to associate user 305 with a particular account maintained by the payment provider as further described herein. A communications application 322, with associated interfaces, enables user device 310 to communicate within system 300.

Merchant server 340 may be maintained, for example, by a merchant or seller offering various products and/or services in exchange for payment to be received over network 360. Merchant server 340 may be used for POS or online purchases and transactions. Generally, merchant server 340 may be maintained by anyone or any entity that receives money, which includes charities as well as retailers and restaurants. Merchant server 340 includes a database 345 identifying available products and/or services (e.g., collectively referred to as items) which may be made available for viewing and purchase by user 305. Accordingly, merchant server 340 also includes a marketplace application 350 which may be configured to serve information over network 360 to browser 315 of user device 310. In one embodiment, user 305 may interact with marketplace application 350 through browser applications over network 360 in order to view various products, food items, or services identified in database 345.

Merchant server 340 also includes a checkout application 355 which may be configured to facilitate the purchase by user 305 of goods or services identified by marketplace application 350. Checkout application 355 may be configured to accept payment information from or on behalf of user 305 through payment service provider server 370 over network 360, such as using selected funding instruments from the smart wallet. For example, checkout application 355 may receive and process a payment confirmation from payment service provider server 370, as well as transmit transaction information to the payment provider and receive information from the payment provider (e.g., a transaction ID).

Payment provider server 370 may be maintained, for example, by an online payment service provider which may provide payment between user 305 and the operator of merchant server 340. In this regard, payment provider server 370 includes one or more payment applications 375 which may be configured to interact with user device 310 and/or merchant server 340 over network 360 to facilitate the purchase of goods or services, communicate/display information, and send payments by user 305 of user device 310 and as discussed above.

Payment provider server 370 also maintains a plurality of user accounts 380, each of which may include account information 385 associated with individual users. For example, account information 385 may include private financial information of users of devices such as account numbers, passwords, device identifiers, user names, phone numbers, credit card information, bank information, or other financial information which may be used to facilitate online transactions by user 305. Advantageously, payment application 375 may be configured to interact with merchant server 340 on behalf of user 305 during a transaction with checkout application 355 to track and manage purchases made by users and which funding sources are used, as well as incentives for a user.

A transaction processing application 390, which may be part of payment application 375 or separate, may be configured to receive information from a user device and/or merchant server 340 for processing and storage in a payment database 395. Transaction processing application 390 may include one or more applications to process information from user 305 for processing an order and payment using various selected funding instruments as described herein. As such, transaction processing application 390 may store details of an order associated with a phrase from individual users. Payment application 375 may be further configured to determine the existence of and to manage accounts for user 305, as well as create new accounts if necessary, such as the set up, management, and use of a smart wallet for the user/mobile device.

Figure 4:
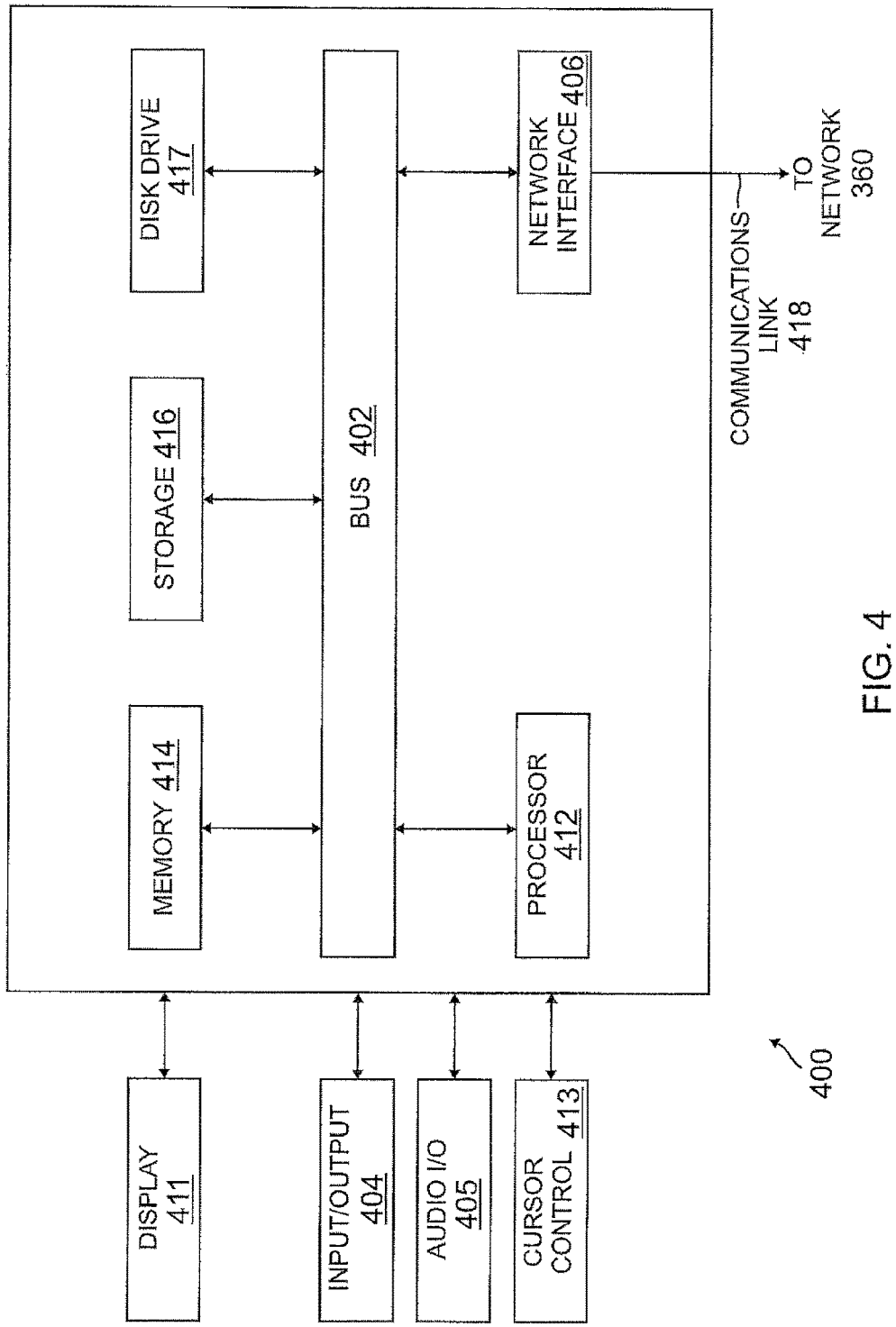
FIG. 4 is a block diagram of a computer system suitable for implementing one or more components in FIG. 3 according to one embodiment.

FIG. 4 is a block diagram of a computer system 400 suitable for implementing one or more embodiments of the present disclosure. In various implementations, the user device may comprise a personal computing device (e.g., smart phone, a computing tablet, a personal computer, laptop, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 may also include an output component, such as a display 411 and a cursor control 413 (such as a keyboard, keypad, mouse, etc.). An optional audio input/output component 405 may also be included to allow a user to use voice for inputting information by converting audio signals. Audio I/O component 405 may allow the user to hear audio. A transceiver or network interface 406 transmits and receives signals between computer system 400 and other devices, such as another user device, a merchant server, or a payment provider server via network 360. In one embodiment, the transmission is wireless, although other transmission mediums and methods may also be suitable. A processor 412, which can be a micro-controller, digital signal processor (DSP), or other processing component, processes these various signals, such as for display on computer system 400 or transmission to other devices via a communication link 418. Processor 412 may also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic may be encoded in a computer readable medium, which may refer to any medium that participates in providing instructions to processor 412 for execution. Such a medium may take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various embodiments of the present disclosure, execution of instruction sequences to practice the present disclosure may be performed by computer system 400. In various other embodiments of the present disclosure, a plurality of computer systems 400 coupled by communication link 418 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A mobile device, comprising:
a near-field communication chip;
a non-transitory memory; and
one or more hardware processors coupled to the non-transitory memory and configured to read instructions from the non-transitory memory to cause the mobile device to perform operations comprising:
in response to receiving a request for performing a mobile payment transaction from a user associated with a user account, detecting, based on signals received by the near-field communication chip of the mobile device, that a point-of-sale (POS) device at a merchant location is within a predetermined distance from the mobile device;
automatically establishing a short-range wireless communication link with the POS device for the mobile payment transaction;
receiving, via the short-range wireless communication link, transaction data associated with the mobile payment transaction;
receiving an input that indicates a selection of a first payment card from one or more payment cards associated with the user account;
detecting that a connection with a payment service provider is unavailable;
in response to detecting that the connection with the payment service provider is unavailable, performing an offline payment transaction process for the mobile payment transaction by transmitting data associated with the first payment card to the POS device via the established short-range wireless communication link;
storing the transaction data at a local storage of the mobile device; and
in response to detecting that the connection with the payment service provider is available, transmitting the locally stored transaction data to the payment service provider.

2. The mobile device of claim 1, wherein the signals received by the mobile device indicates a physical contact made between the mobile device and the POS device.

3. The mobile device of claim 1, further comprising a fingerprint sensor configured to receive fingerprint data, wherein the operations further comprise presenting the one or more payment cards on a display of the mobile device based on the fingerprint data received.

4. The mobile device of claim 1, wherein the operations further comprise:
determining an amount associated with the mobile payment;
selecting, from a plurality of authentication levels, a first authentication level for authenticating the user to access the user account based on the amount; and
prompting, via a display of the mobile device, the user to submit authentication data according to the first authentication level.

5. The mobile device of claim 4, wherein the operations further comprise authenticating the user according to the first authentication level based on the authentication data received from the user, wherein the data associated with the first payment card is transmitted to the POS device in response to authenticating the user according to the first authentication level.

6. A non-transitory machine readable medium having stored thereon machine-readable instructions executable to cause a mobile device to perform operations comprising:
in response to receiving a request for performing a mobile payment transaction from a user associated with a user account, detecting, based on signals received from a near-field communication chip of the mobile device, that a point-of-sale (POS) device at a merchant location is within a predetermined distance from the mobile device;
automatically establishing a short-range wireless communication link with the POS device for the mobile payment transaction;
receiving, via the short-range wireless communication link, transaction data associated with the mobile payment transaction;
receiving input data indicating a selection of a first payment card from one or more payment cards determined for the merchant location;
determining that a power level of a battery of the mobile device is below a predetermined threshold;
in response to determining that the power level of a battery of the mobile device is below the predetermined threshold, initiating an offline payment process for the mobile payment transaction by transmitting data associated with the first payment card to the POS device via the established short-range wireless communication link;
storing the transaction data at a local storage of the mobile device; and
in response to determining that the power level of the battery is above the predetermined threshold, transmitting the locally stored transaction data to the payment service provider to complete the mobile payment transaction.

7. The non-transitory machine readable medium of claim 6, wherein the operations further comprise:
determining a location of the mobile device; and
determining the one or more payment cards from a plurality of payment cards associated with the user account based at least in part on the determined location of the mobile device.

8. The non-transitory machine readable medium of claim 7, wherein determining the location of the mobile device is based at least on a wireless signal received from a Bluetooth device associated with the merchant location.

9. The non-transitory machine readable medium of claim 8, wherein the Bluetooth device is the POS device, and wherein the short-range wireless communication link with the POS device is established based on the received signal.

10. The non-transitory machine readable medium of claim 6, wherein the operations further comprise determining the one or more payment cards from a plurality of payment cards associated with the user account based at least on a name of the merchant location.

11. The non-transitory machine readable medium of claim 6, wherein the operations further comprise determining the one or more payment cards from a plurality of payment cards associated with the user account based at least on expiration dates associated with the plurality of payment cards.

12. A method, comprising:
   in response to receiving a request for performing a mobile payment transaction from a user associated with a user account, detecting, by one or more hardware processors associated with a mobile device based on signals received by a near-field communication chip of the mobile device, that a point-of-sale (POS) device at a merchant location is within a predetermined distance from the mobile device;
   automatically establishing, by the one or more hardware processors, a short-range wireless communication link with the POS device;
   receiving, by the one or more hardware processors via the short-range wireless communication link, transaction data associated with the mobile payment transaction;
   receiving, by the one or more hardware processors, input data indicating a selection of a first payment card from one or more payment cards associated with the user account;
   detecting, by the one or more hardware processors, that a connection with a payment service provider is unavailable;
   in response to detecting that the connection with the payment service provider is unavailable, initiating an offline payment process for the mobile payment transaction by transmitting, by the one or more hardware processors, data associated with the first payment card to the POS device via the established short-range wireless communication link;
   storing, by the one or more hardware processors, the transaction data at a local storage of the mobile device; and
   in response to detecting that the connection with the payment service provider is available, transmitting, by the one or more hardware processors, the locally stored transaction data to the payment service provider.

13. The method of claim 12, further comprising:
   determining, by the one or more hardware processors, an amount associated with the mobile payment transaction;
   selecting, from a plurality of authentication levels, a first authentication level for authenticating the user to access the user account based on the amount; and
   presenting, on the mobile device, a request for authentication data to complete the mobile payment transaction according to the first authentication level.

14. The method of claim 13, further comprising receiving the authentication data from the user to complete the mobile payment transaction, wherein the mobile payment transaction is completed based at least on the authentication data.

15. The method of claim 13, further comprising receiving biometric data from the user responsive to the request for authentication data based at least on a biometric input received by the mobile device, wherein the mobile payment transaction is completed based at least on the biometric data.

16. The method of claim 13, wherein detecting that the connection with the payment service provider is limited comprises determining that the mobile device is offline from one or more networks, and
   wherein transmitting the locally stored transaction data to the payment service provider comprises updating the user account with the stored transaction data.

17. The mobile device of claim 1, wherein the near-field communication chip is configured to receive energy from the POS device of the merchant location to complete the offline payment process.

18. The mobile device of claim 1, wherein the operations further comprise determining the one or more payment cards from a plurality of payment cards associated with the user account based at least on a name of the merchant location.

19. The mobile device of claim 1, wherein the operations further comprise determining the one or more payment cards from a plurality of payment cards associated with the user account based at least on expiration dates associated with the plurality of payment cards.

20. The mobile device of claim 1, wherein detecting that the connection with the payment service provider is limited comprises determining that the mobile device is offline from one or more networks,
   and wherein transmitting the locally stored transaction data to the payment service provider comprises updating the user account with the locally stored transaction data.

* * * * *